US012756661B2

(12) United States Patent
Barth et al.

(10) Patent No.: US 12,756,661 B2
(45) Date of Patent: Oct. 6, 2026

(54) LINK POWER MANAGEMENT PROTOCOL FOR CONNECTED NETWORK DEVICES

(71) Applicant: Juniper Networks, Inc., Sunnyvale, CA (US)

(72) Inventors: Jonathan C. Barth, Collegeville, PA (US); Srihari Ramachandra Sangli, Bengaluru (IN); Vyasraj Satyanarayana, Bangalore (IN); Sandip Kumar Ghosh, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 31 days.

(21) Appl. No.: 18/758,702

(22) Filed: Jun. 28, 2024

(65) Prior Publication Data

US 2025/0106139 A1 Mar. 27, 2025

(30) Foreign Application Priority Data

Sep. 26, 2023 (IN) ............................ 202341064503

(51) Int. Cl.
*H04L 45/00* (2022.01)
*G06F 1/28* (2006.01)
(Continued)

(52) U.S. Cl.
CPC ................ *H04L 45/70* (2013.01); *G06F 1/28* (2013.01); *G06F 1/3206* (2013.01);
(Continued)

(58) Field of Classification Search
CPC ......... Y02D 10/00; Y02D 30/70; H04W 4/80; H04W 76/14; H04L 12/12
See application file for complete search history.

(56) References Cited

U.S. PATENT DOCUMENTS 5,367,517 A 11/1994 Cidon et al.
7,417,985 B1 8/2008 McCrosky et al.
(Continued)

FOREIGN PATENT DOCUMENTS

CN 113841106 A * 12/2021 ........... G06F 1/3253
CN 115550286 A * 12/2022 ............. H04L 49/30
(Continued)

OTHER PUBLICATIONS

Bierman et al., "A Yang Data Model for Hardware Management," Internet Engineering Task Force (IETF), Request for Comments: 8348, Mar. 2018, 60 Pages.
(Continued)

*Primary Examiner* — Chirag R Patel
(74) *Attorney, Agent, or Firm* — Harrity & Harrity, LLP

(57) ABSTRACT

A first network device may provide a link discovery message to a second network device, and may identify a link based on the link discovery message. The first network device may provide, to the second network device, a first control channel message that identifies the link at the first network device, a current state of the link as a power on state, and a desired state of the link as a power sleep state, and may receive, from the second network device, a second control channel message that identifies the link at the second network device, the
(Continued)

current state of the link as the power on state, and the desired state of the link as the power sleep state. The first network device may place the link in the power sleep state based on the first control channel message and the second control channel message.

20 Claims, 9 Drawing Sheets

(51) Int. Cl.

| | |
|---|---|
| ***G06F 1/3206*** | (2019.01) |
| ***G06F 1/3234*** | (2019.01) |
| ***H04L 12/12*** | (2006.01) |
| ***H04L 41/0604*** | (2022.01) |
| ***H04L 41/069*** | (2022.01) |
| ***H04L 43/10*** | (2022.01) |
| ***H04L 45/02*** | (2022.01) |
| ***H04L 45/03*** | (2022.01) |
| ***H04L 45/12*** | (2022.01) |
| ***H04L 45/24*** | (2022.01) |
| ***H04L 45/28*** | (2022.01) |
| ***H04L 47/10*** | (2022.01) |
| ***H04L 47/12*** | (2022.01) |
| ***H04L 47/125*** | (2022.01) |
| ***H04W 52/02*** | (2009.01) |
| *G06Q 30/018* | (2023.01) |

(52) U.S. Cl.

CPC ............ *G06F 1/3234* (2013.01); *H04L 12/12* (2013.01); *H04L 41/0622* (2013.01); *H04L 41/0627* (2013.01); *H04L 41/069* (2013.01); *H04L 43/10* (2013.01); *H04L 45/02* (2013.01); *H04L 45/03* (2022.05); *H04L 45/126* (2013.01); *H04L 45/245* (2013.01); *H04L 45/28* (2013.01); *H04L 47/12* (2013.01); *H04L 47/125* (2013.01); *H04L 47/29* (2013.01); *H04W 52/0235* (2013.01); *H04W 52/0248* (2013.01); *H04W 52/0274* (2013.01); *G06Q 30/018* (2013.01)

(56) References Cited

U.S. PATENT DOCUMENTS

| | | | | |
|---|---|---|---|---|
| 8,340,111 | B1 | 12/2012 | Krivitski et al. | |
| 8,570,160 | B2 | 10/2013 | Speegle et al. | |
| 9,509,377 | B2 | 11/2016 | Sayana et al. | |
| 9,606,604 | B1 | 3/2017 | Butter | |
| 9,992,129 | B2 | 6/2018 | Grosso et al. | |
| 10,326,638 | B2 | 6/2019 | Banerjee et al. | |
| 10,552,253 | B2 * | 2/2020 | Iyer | H04L 1/00 |
| 10,819,556 | B1 | 10/2020 | Rangasamy et al. | |
| 10,972,293 | B1 | 4/2021 | Benyamin et al. | |
| 12,021,689 | B1 | 6/2024 | Rayes et al. | |
| 12,079,061 | B2 * | 9/2024 | Srivastava | G06F 13/4221 |
| 2003/0185208 | A1 | 10/2003 | Kim et al. | |
| 2003/0202468 | A1 | 10/2003 | Kennedy et al. | |
| 2007/0201380 | A1 | 8/2007 | Ma et al. | |
| 2007/0283178 | A1 | 12/2007 | Dodeja et al. | |
| 2008/0304519 | A1 | 12/2008 | Koenen et al. | |
| 2009/0204828 | A1 | 8/2009 | Diab et al. | |
| 2010/0057386 | A1 | 3/2010 | Hillis et al. | |
| 2010/0118753 | A1 | 5/2010 | Mandin et al. | |
| 2010/0277296 | A1 * | 11/2010 | DeMille | B60R 25/10 340/426.1 |
| 2011/0038291 | A1 | 2/2011 | Seok | |
| 2011/0161709 | A1 | 6/2011 | Chen | |
| 2011/0310736 | A1 | 12/2011 | Dighe et al. | |
| 2012/0063364 | A1 | 3/2012 | Emmelmann et al. | |
| 2012/0127894 | A1 | 5/2012 | Nachum | |
| 2013/0003559 | A1 | 1/2013 | Matthews | |
| 2013/0042126 | A1 | 2/2013 | Ganesan et al. | |
| 2013/0070754 | A1 | 3/2013 | Iovanna et al. | |
| 2013/0286846 | A1 | 10/2013 | Atlas et al. | |
| 2013/0322258 | A1 | 12/2013 | Akhter et al. | |
| 2013/0332762 | A1 | 12/2013 | Meirosu et al. | |
| 2014/0119252 | A1 | 5/2014 | Kella et al. | |
| 2014/0155029 | A1 | 6/2014 | Kolaks et al. | |
| 2014/0169176 | A1 | 6/2014 | Brock | |
| 2014/0191733 | A1 | 7/2014 | Kaanta et al. | |
| 2014/0321315 | A1 | 10/2014 | Akhter et al. | |
| 2014/0372576 | A1 | 12/2014 | Mohandas et al. | |
| 2015/0188354 | A1 | 7/2015 | Sun et al. | |
| 2015/0208341 | A1 | 7/2015 | Mohamed et al. | |
| 2015/0288599 | A1 | 10/2015 | Zhou et al. | |
| 2015/0312769 | A1 | 10/2015 | Shindo | |
| 2016/0094435 | A1 * | 3/2016 | Goss | H04L 49/10 709/223 |
| 2016/0164794 | A1 | 6/2016 | Ramalingam et al. | |
| 2016/0197784 | A1 | 7/2016 | Gandhi et al. | |
| 2016/0253522 | A1 | 9/2016 | Wirch et al. | |
| 2016/0302203 | A1 | 10/2016 | Liu et al. | |
| 2017/0117709 | A1 | 4/2017 | Svedendahl et al. | |
| 2017/0201425 | A1 | 7/2017 | Marinelli et al. | |
| 2017/0214539 | A1 | 7/2017 | Chu et al. | |
| 2018/0206190 | A1 | 7/2018 | Cherian et al. | |
| 2018/0241466 | A1 | 8/2018 | Inagaki | |
| 2018/0343613 | A1 | 11/2018 | Levy et al. | |
| 2019/0163255 | A1 | 5/2019 | Dewey et al. | |
| 2019/0190575 | A1 | 6/2019 | Stjernman et al. | |
| 2019/0258807 | A1 | 8/2019 | DiMaggio et al. | |
| 2020/0067821 | A1 | 2/2020 | Sebastian | |
| 2020/0250125 | A1 * | 8/2020 | Yoshihara | G06F 13/4221 |
| 2020/0371578 | A1 * | 11/2020 | Murali | G06F 1/3228 |
| 2021/0044444 | A1 | 2/2021 | Shukla et al. | |
| 2021/0216685 | A1 | 7/2021 | Su et al. | |
| 2021/0218704 | A1 | 7/2021 | Zhang et al. | |
| 2021/0385692 | A1 | 12/2021 | Kwon et al. | |
| 2022/0011840 | A1 | 1/2022 | Parks et al. | |
| 2022/0116862 | A1 | 4/2022 | Cariou | |
| 2022/0166705 | A1 | 5/2022 | Froese | |
| 2022/0239547 | A1 | 7/2022 | Wang et al. | |
| 2022/0369403 | A1 | 11/2022 | Fang et al. | |
| 2023/0029987 | A1 | 2/2023 | Gandhi et al. | |
| 2023/0062989 | A1 | 3/2023 | Kim et al. | |
| 2023/0319722 | A1 | 10/2023 | Wang et al. | |
| 2023/0325342 | A1 * | 10/2023 | Srivastava | G06F 13/4018 710/313 |
| 2023/0393772 | A1 * | 12/2023 | Benisty | G06F 3/067 |
| 2024/0137860 | A1 | 4/2024 | Asterjadhi et al. | |
| 2024/0205823 | A1 | 6/2024 | Yang et al. | |
| 2024/0214313 | A1 | 6/2024 | Voit et al. | |
| 2024/0256014 | A1 | 8/2024 | Brar et al. | |
| 2024/0333590 | A1 | 10/2024 | Pignataro et al. | |
| 2024/0349373 | A1 | 10/2024 | Dong | |
| 2024/0381259 | A1 | 11/2024 | Mondal et al. | |
| 2024/0422101 | A1 | 12/2024 | Sivakumar et al. | |
| 2025/0007810 | A1 | 1/2025 | Ashlock et al. | |
| 2025/0039057 | A1 | 1/2025 | Ashlock et al. | |
| 2025/0039097 | A1 | 1/2025 | Kazimirsky et al. | |
| 2025/0080464 | A1 | 3/2025 | Pignataro et al. | |
| 2025/0193954 | A1 | 6/2025 | Yun et al. | |

FOREIGN PATENT DOCUMENTS

| | | | |
|---|---|---|---|
| CN | 116017782 | A | 4/2023 |
| EP | 4061063 | A1 | 9/2022 |
| WO | 2012155987 | A1 | 11/2012 |
| WO | 2022228085 | A1 | 11/2022 |

OTHER PUBLICATIONS

Bierman et al., "A Yang Data Model for System Management," Internet Engineering Task Force (IETF), Request for Comments: 7317, Aug. 2014, 35 Pages.

Bjorklund et al., "The Yang 1.1 Data Modeling Language," Internet Engineering Task Force (IETF), Request for Comments: 7950, Aug. 2016, 217 Pages.

(56) References Cited

OTHER PUBLICATIONS

Bjorklund, M., (Ed.,) "Yang—A Data Modeling Language for the Network Configuration Protocol (NETCONF)," IETF RFC 6020, http://datatracker.ietf.org/doc/rfc6020/, Oct. 2010, 173 pages.
Bonica et al., "Extended ICMP to Support Multi-Part Messages," Network Working Group, Request for Comments:4884, Apr. 2007, 19 Pages.
"Chkirbene, Z., et al., "Efficient Techniques for Energy Saving in Data Center Networks", Computer Communications, Elsevier Science Publishers Bv, Amsterdam, NL, vol. 129, Jul. 29, 2018, pp. 111-124, XP085477963, ISSN: 0140-3664, DOI:10.1016/J.COMCOM.2018.07.025".
Dhanuka A., et al., "How to Use Energy Efficient Ethernet (IEEE 802.3az) With Texas Instruments Ethernet PHYs," Texas Instruments, SNLA328—Oct. 2019, 15 Pages.
Ethernet Switching User Guide, Juniper Networks, Website: https://standards.ieee.org/ieee/802.1AB/6047/, Dec. 14, 2023, 1158 Pages.
Extended European Search Report for European Application No. EP24150429.9 dated Jul. 2, 2024, 11 pages.
Extended European Search Report for European Application No. EP24151927 dated Jul. 16, 2024, 10 pages.
Extended European Search Report for European Application No. EP241871235 dated Dec. 6, 2024, 10 pages.
Extended European Search Report for European Application No. EP241877513 dated Dec. 9, 2024, 41 pages.
Extended European Search Report for European Application No. EP24188097 dated Dec. 18, 2024, 8 pages.
Ginsberg et al., "Advertising Generic Information in IS-IS," Internet Engineering Task Force (IETF), Request for Comments: Dec. 2010, 11 Pages.
Gupta, M., et al., Dynamic Ethernet Link Shutdown for Energy Conservation on Ethernet Links, IEEE International Conference on Communications (ICC), Jun. 1, 2007, pp. 6156-6161.
IEEE Standard for Local and metropolitan area networks, "Station and Media Access Control Connectivity Discovery," IEEE Computer Society, Website: https://www.juniper.net/documentation/us/en/software/junos/useraccess/topics/ref/statement/lldp-edit-protocols.html, 2016, 146 Pages.
IEEE Standards Association., "Station and Media Access Control Connectivity Discovery," IEEE, Jan. 29, 2016, 146 pages.
Junos Os., "User Access and Authentication Administration Guide for Junos OS," Juniper Networks Inc., Jun. 14, 2023, 1786 pages.
Martin R., "IEEE P802.1, Draft 1.0, Bridges and Bridged Networks—Link Aggregation," IEEE 802.1 Working Group, Dec. 2020, Nurnberg, Germany, 349 Pages.
Moy, J., "Extending OSPF to Support Demand Circuits," Network Working Group, Request for Comments: 1793, pp. 1-32, Apr. 1995.
OpenConfig: Platform model, Website: https://openconfig.net/projects/modelsischemadocs/jstree/openconfig-platform.html, Obtained Apr. 30, 2024, 199 Pages.
Website: https://en.wikipedia.org/wiki/Traceroute; Obtained Apr. 25, 2024, 5 Pages.

* cited by examiner

LINK POWER MANAGEMENT PROTOCOL FOR CONNECTED NETWORK DEVICES

CROSS-REFERENCE TO RELATED APPLICATION

This Patent Application claims priority to India Provisional Patent Application No. 202341064503, filed on Sep. 26, 2023, entitled "SYSTEMS AND METHODS FOR PROVIDING ENERGY EFFICIENT NETWORKS," and assigned to the assignee hereof. The disclosure of the prior application is considered part of and is incorporated by reference into this Patent Application.

BACKGROUND

An interface or port of a network device includes multiple hardware components (e.g., optics, a laser, a processor, and/or the like) that enable the network device to establish a link with another network device. An interface or port of the other network device also includes such multiple hardware components.

SUMMARY

Some implementations described herein relate to a method. The method may include providing, by a first network device, a link discovery message to a second network device, and identifying a link with the second network device based on the link discovery message. The method may include providing, to the second network device, a first control channel message that identifies the link at the first network device, a current state of the link as a power on state, and a desired state of the link as a power sleep state, and receiving, from the second network device, a second control channel message that identifies the link at the second network device, the current state of the link as the power on state, and the desired state of the link as the power sleep state. The method may include placing the link in the power sleep state based on the first control channel message and the second control channel message.

Some implementations described herein relate to a first network device. The first network device may include one or more memories and one or more processors. The one or more processors may be configured to provide a link discovery message to a second network device, and identify a link with the second network device based on the link discovery message. The one or more processors may be configured to provide, to the second network device, a first control channel message that identifies the link at the first network device, a current state of the link as a power on state, and a desired state of the link as a power sleep state, and receive, from the second network device, a second control channel message that identifies the link at the second network device, the current state of the link as the power on state, and the desired state of the link as the power sleep state. The one or more processors may be configured to divert all traffic flowing on the link, and place the link in the power sleep state based on the first control channel message and the second control channel message.

Some implementations described herein relate to a non-transitory computer-readable medium that stores a set of instructions. The set of instructions, when executed by one or more processors of a first network device, may cause the first network device to provide a link discovery message to a second network device a, and identify a link with the second network device based on the link discovery message.

The set of instructions, when executed by one or more processors of the first network device, may cause the first network device to provide, to the second network device, a first control channel message that identifies the link at the first network device, a current state of the link as a power on state, and a desired state of the link as a power sleep state, and receive, from the second network device, a second control channel message that identifies the link at the second network device, the current state of the link as the power on state, and the desired state of the link as the power sleep state. The set of instructions, when executed by one or more processors of the first network device, may cause the first network device to determine that the power sleep state requested in the first control channel message is acknowledged when the desired state of the link in the second control channel message is set to the power sleep state, and place the link in the power sleep state based on the first control channel message and the second control channel message.

DETAILED DESCRIPTION

Figure 1A:
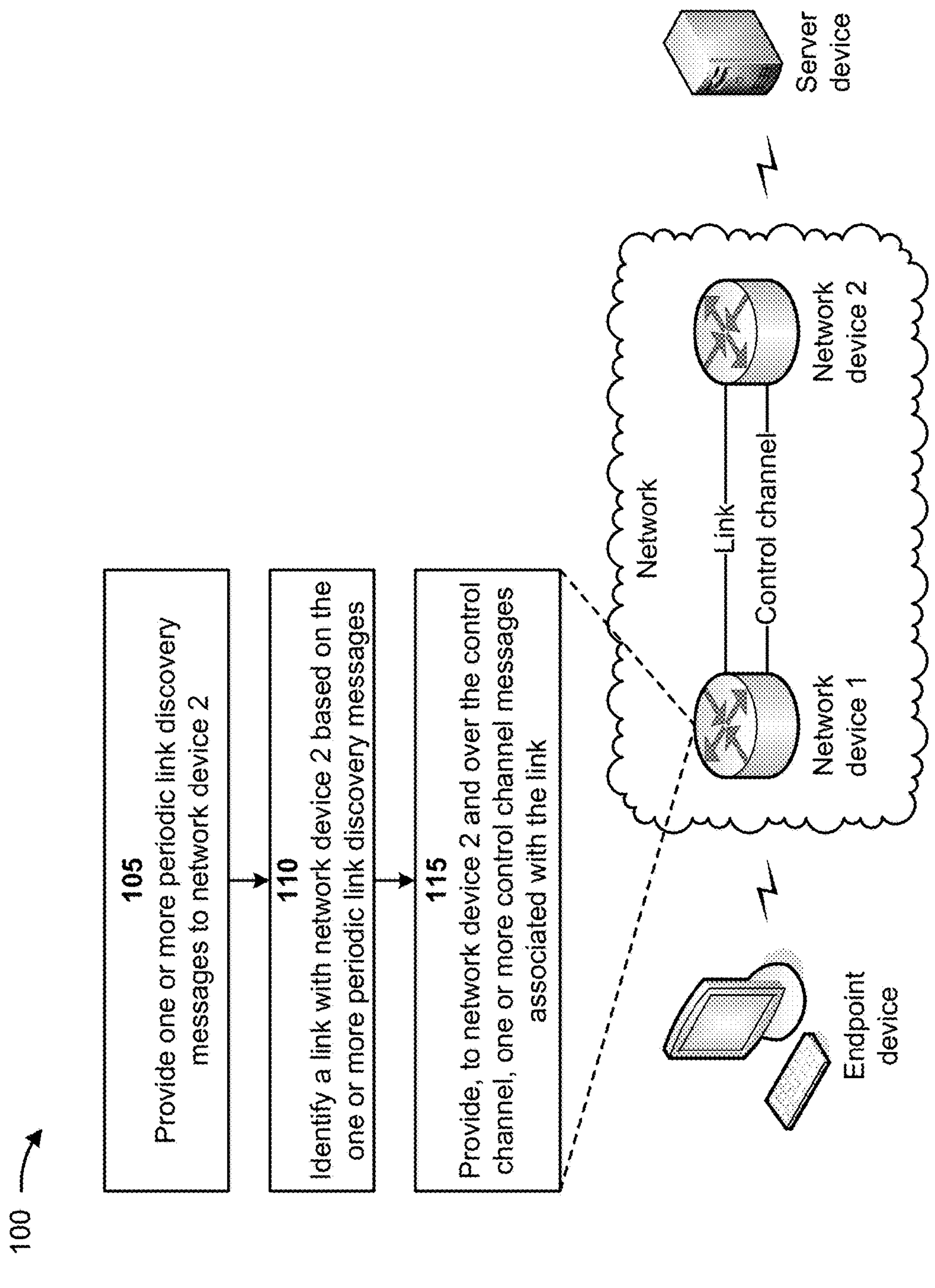
FIGS. 1A-1E are diagrams of an example associated with providing a link power management protocol for connected network devices.

The following detailed description of example implementations refers to the accompanying drawings. The same reference numbers in different drawings may identify the same or similar elements.

A network may include multiple energy efficient (e.g., green) network devices and multiple energy inefficient network devices. Network planners design a network for worst-case traffic conditions while also catering to various potential resiliency scenarios. Typically, the network capacity is under-utilized, due to traffic conditions. Also, the actual traffic patterns may exhibit periodicity with regard to overall network utilization.

The total power required to keep a link and an interface of a network device operational is significant. The link, the interface, and associated hardware components consume significant power even when the link and the interface are in an idle state (e.g., not sending or receiving traffic). For example, a network device with one hundred and 400 gigabit (Gb) ports will consume kilowatts (kW) of power for the interfaces alone. Furthermore, when two directly-connected network devices are not exchanging traffic, the links and the interfaces of the network devices unnecessarily consume power. Thus, current techniques for managing network devices consume computing resources (e.g., processing resources, memory resources, communication resources, and/or the like), power resources, networking resources, and/or the like associated with failing to adjust power consumption and bandwidth of connected network devices based on a traffic rate, failing to power off links and interfaces of the connected network device during idle states and wasting power with the idle links and interfaces, failing to power off the idle links and interfaces during non-peak utilization times of the connected network devices, unnecessarily maintaining the idle links and interfaces during non-peak utilization times of the connected network devices, and/or the like.

Some implementations described herein relate to providing a link power management protocol for connected network devices. For example, a first network device may provide a link discovery message to a second network device, and may identify a link with the second network device based on the link discovery message. The first network device may provide, to the second network device, a first control channel message that identifies the link at the first network device, a current state of the link as a power on state, and a desired state of the link as a power sleep state, and may receive, from the second network device, a second control channel message that identifies the link at the second network device, the current state of the link as the power on state, and the desired state of the link as the power sleep state. The first network device may divert all traffic flowing on the link, and may place the link in the power sleep state based on the first control channel message and the second control channel message.

In this way, the implementations provide a link power management protocol for connected network devices. For example, a first network device may be connected to a second network device via a link. The connected network devices may utilize the link power management protocol to control transition events (e.g., transitioning a link to a power sleep state), and to enable higher layer protocols to prepare for the transition events. The first network device may exchange one or more periodic link discovery messages with the second network device to identify a link participating in power state changes. The first network device may exchange one or more control channel messages with the second network device to implement a power state change for the identified link. Thus, the connected network devices conserve computing resources, networking resources, and/or the like that would otherwise have been consumed by failing to adjust power consumption and bandwidth of connected network devices based on a traffic rate, failing to power off links and interfaces of the connected network device during idle states and wasting power with the idle links and interfaces, failing to power off the idle links and interfaces during non-peak utilization times of the connected network devices, unnecessarily maintaining the idle links and interfaces during non-peak utilization times of the connected network devices, and/or the like.

FIGS. 1A-1E are diagrams of an example 100 associated with providing a link power management protocol for connected network devices. As shown in FIG. 1A, the example 100 includes an endpoint device associated with a network and a server device. The network may include multiple network devices, such as a first network device (e.g., network device 1) and a second network device (e.g., network device 2). A link and a control channel may be provided between the first network device and the second network device. Further details of the endpoint device, the server device, the network, the network devices, the link, and the control channel are provided elsewhere herein.

As further shown in FIG. 1A, and by reference number 105, the first network device may provide, to the second network device, one or more periodic link discovery messages to the second network device. For example, the network devices may utilize a link power management protocol to control power transition events gracefully and to enable higher layer protocols to prepare for the transition events. In some implementations, the network devices may be associated with a network controller that utilizes the link power management protocol to control power transition events gracefully and to enable higher layer protocols to prepare for the transition events. In some implementations, the network controller may provide preconfigured policies that interact with the link power management protocol to control link states. The network devices may utilize the link power management protocol to generate and provide the link discovery messages. The network devices may periodically exchange link discovery messages to identify one or more links participating in power state changes. In some implementations, each link discovery message may include a Layer 3 Internet protocol (IP) frame with a time to live (TTL) value set to one (e.g., which restricts further forwarding of the IP frame beyond a single hop or routing of the link discovery message). The link discovery message may include an IP source address that is a locally configured address or a loopback address, and a configured neighbor destination IP address. In some implementations, each link discovery message may include a protocol data unit (PDU) message that enables a network device (e.g., the first network device) to discover end port details of a peer network device (e.g., the second network device), and to discover local and remote port pairing information. Periodic transmission of the link discovery messages may enable a network device to detect link liveness. Further details of the link discovery message are provided below in connection with FIG. 1B.

As further shown in FIG. 1A, and by reference number 110, the first network device may identify a link with the second network device based on the one or more periodic link discovery messages. For example, the periodic link discovery messages may be utilized by the first network device to identify a link (e.g., with the second network device) participating in power state changes. In some implementations, a link discovery message may enable the first network device to discover end port details of the second network device and associated with the link, and to discover local and remote port pairing information of the first network device and associated with the link.

As further shown in FIG. 1A, and by reference number 115, the first network device may provide, to the second network device and over the control channel, one or more control channel messages associated with the link. For example, the network devices (e.g., the first network device and the second network device) may utilize the link power management protocol to generate and provide the one or more control channel messages associated with the link. In some implementations, each control channel message may include a PDU message. The one or more control channel messages may include request-response messages (e.g., Layer 3 messages) provided over a virtual control channel (e.g., encoded over transmission control protocol/Internet protocol (TCP/IP)) connecting the first network device and the second network device. The one or more control channel messages may be directly provided to the second network device or via one or more other network devices (e.g., a multi-hop). A control channel message may be utilized by the first network device for managing session up or down status or for initiating a power state change request with the second network device. Further details of the control channel message are provided below in connection with FIG. 1C.

The link power management protocol may identify each network device by an identification (e.g., a Node ID) that is unique across the network, such as a thirty-two-bit network device ID or any other existing identification of the network device. The link power management protocol may utilize a null terminated character string to identify a network device side of the link (e.g., a first side connected to the first network device and a second side connected to the second network device). This may enable independent implementation approaches without any restriction for any consistent link numbering. Various applications (e.g., routing protocols, telemetry, configuration settings, and/or the like) may interact with the link power management protocol to transition a link to a desired link state. The link power management protocol may interact with platform management software to power off or power on links. A link may be placed in a powered-on state when the link is participating in transmission or receipt of traffic. A link may be placed in a power sleep state when the link is powered off by the link power management protocol. A link may be placed in a powered-off state when the link is administratively powered off.

Figure 1B:
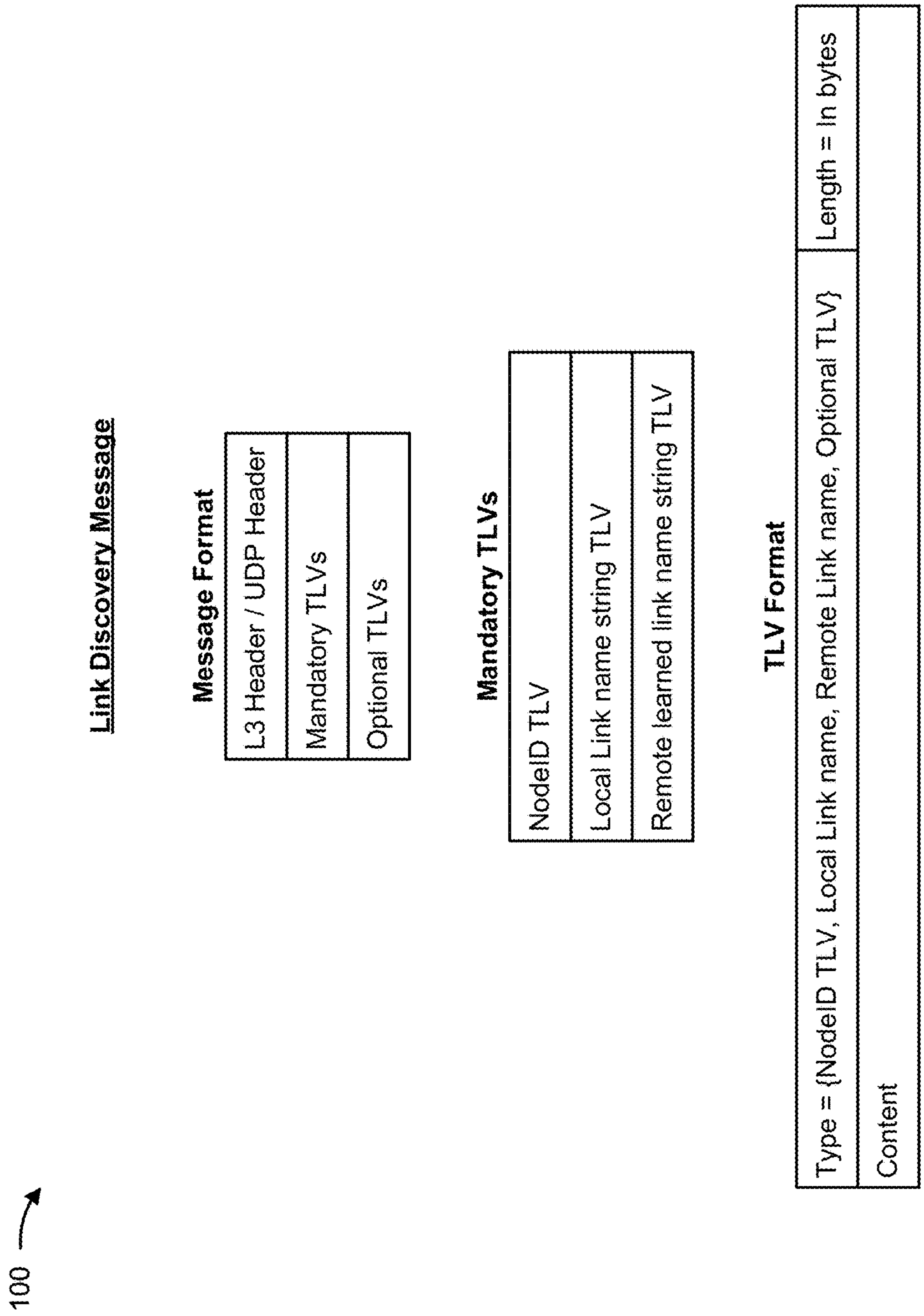

FIG. 1B depicts example information associated with a link discovery message. As shown, the link discovery message may include a message format with a Layer 3 (L3) header and/or a user datagram protocol (UDP) header, mandatory information elements (e.g., type-length-value elements (TLVs)), and optional information elements (e.g., TLVs). The mandatory information elements may include a Node ID information element (e.g., a TLV) identifying a network device (e.g., the first network device), a local link name string information element (e.g., a TLV) identifying a name of the link at the network device (e.g., the first network device), and a remote learned link name string information element (e.g., a TLV) identifying a name of the link at a peer network device (e.g., the second network device). The format of an information element (e.g., a TLV) may include a type identifying the Node ID TLV, the local link name string TLV, the remote learned link name string TLV, and an optional TLV. The format of a TLV may also include a length information element (e.g., in bytes) and content.

The Node ID TLV may include a unique distinguisher of a network device across the network. The local link name string TLV may include an encoded character string with a length identified in a TLV field of a local port. The remote learned link name string TLV may include an encoded character string with a length identified in a TLV field of a remote port. The optional TLV may include two types of optional timer values: a link up alarm suppression timer and a power sleep wait timer. The link up alarm suppression timer may include timer value settings shared by a peer network device that is used for suppressing alarms temporarily during power state transition. After power state transition negotiation is acknowledged, a peer network device may wait for expiration of the power sleep wait timer before placing the link in the power sleep state. A value of the power sleep wait timer may be selected such that the power sleep wait timer provides sufficient time for data to be flushed out or for any protocol actions to be performed.

Figure 1C:
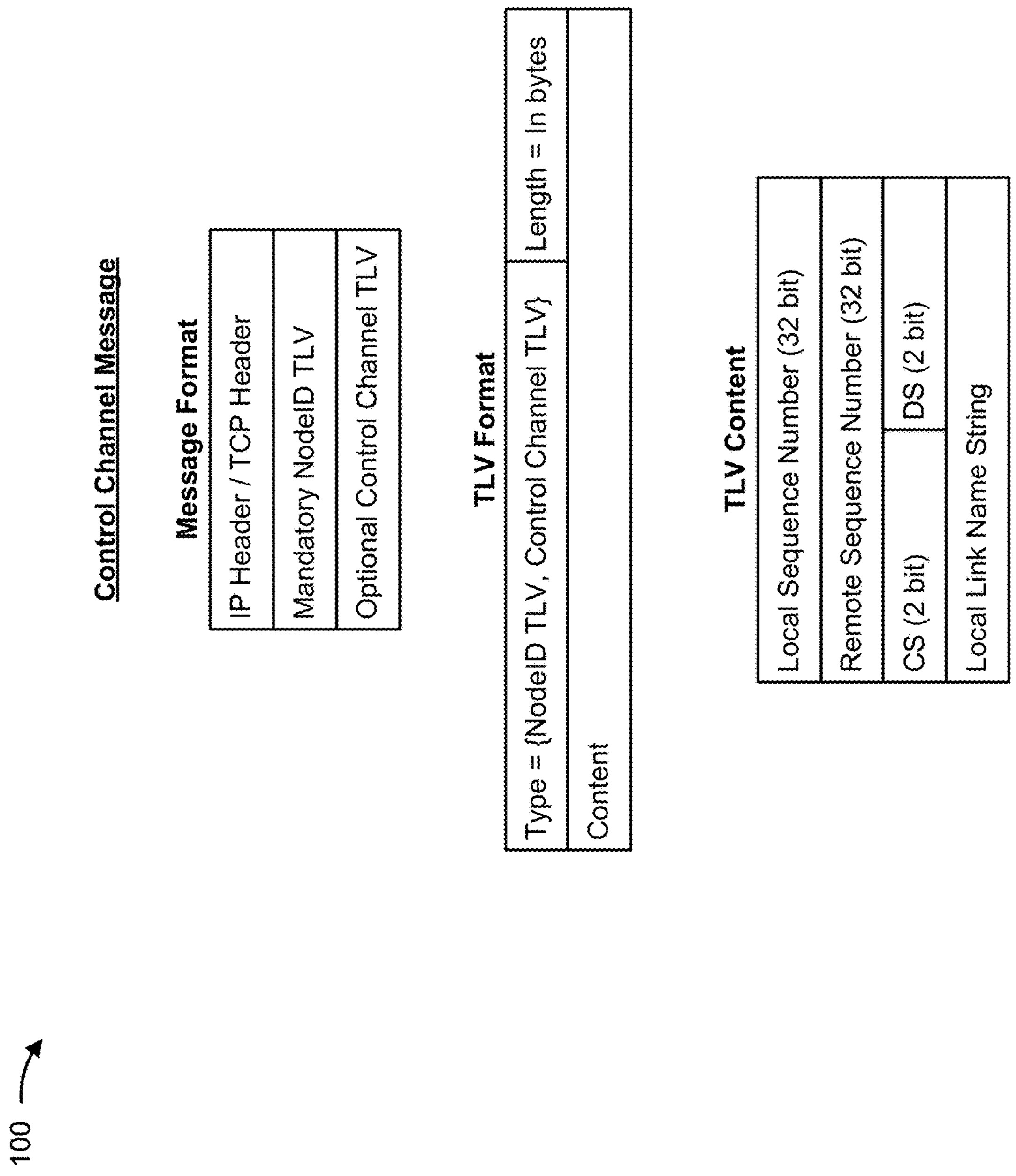

FIG. 1C depicts example information associated with a control channel message. As shown, the control channel message may include a message format with an IP header/TCP header, a mandatory information element (e.g., a Node ID TLV), and an optional information element (e.g., a control channel TLV). The format of an information element (e.g., a TLV) may include a type identifying the Node ID TLV and the control channel TLV. The format of a TLV may also include a length information element (e.g., in bytes) and content. The TLV content may include a local sequence number (e.g., thirty-two bits), a remote sequence number (e.g., thirty-two bits), a current state (CS) (e.g., two bits), a desired state (DS) (e.g., two bits), and a local link name string. The Node ID TLV may include a unique distinguisher of a network device across the network. The local sequence number may include a running sequence number, and the remote sequence number may include a response to a last sequence number. The current state may include a current power state of a link under consideration, and a desired state may include a desired power state of the link under consideration. The local link name string may include an encoded character string with a length identified in a TLV field of a local port.

Figure 1D:
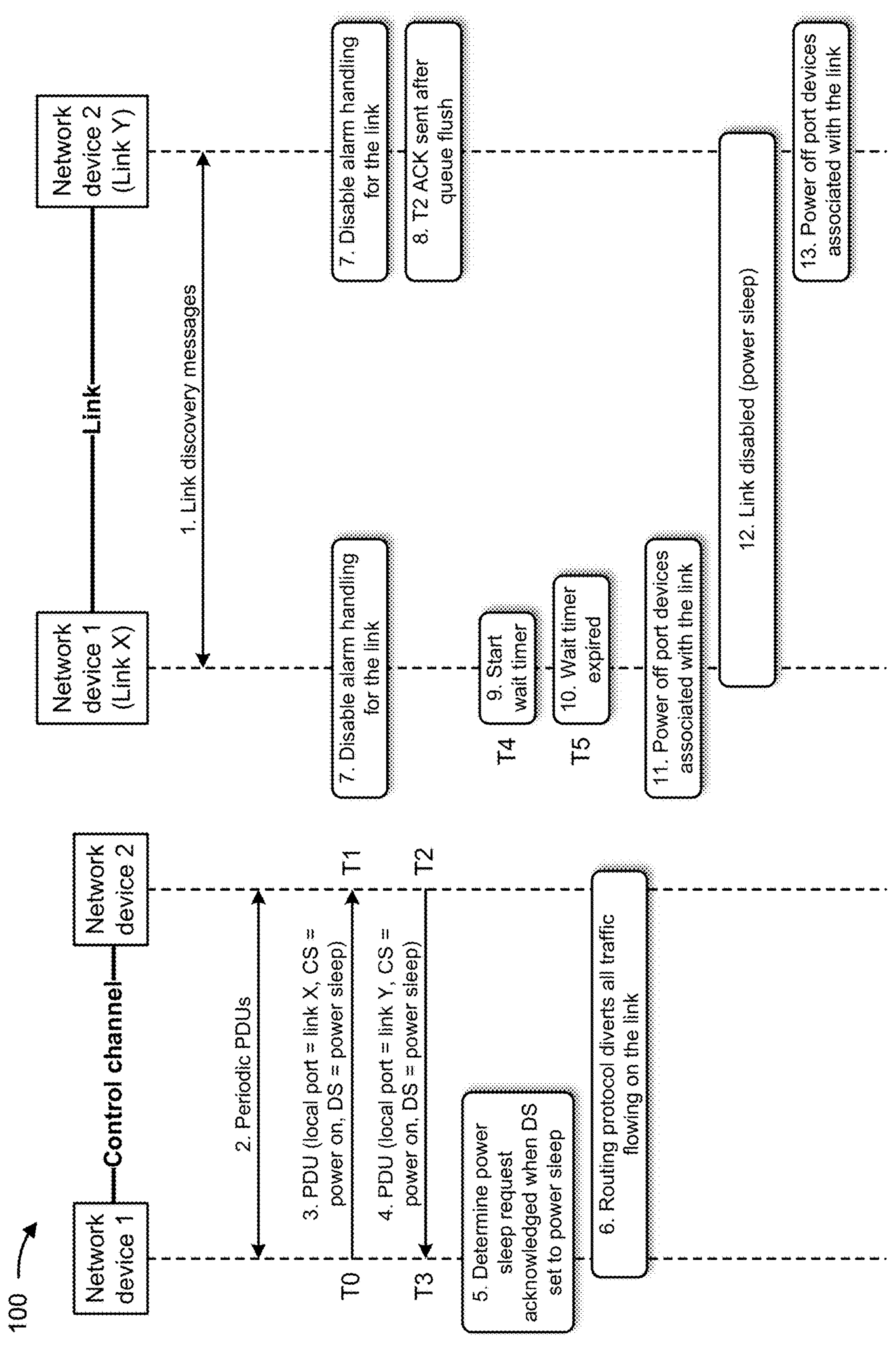

FIG. 1D is a flow diagram depicting example interactions associated with a transition of the link from a power on state to a power sleep state. As shown at step 1 of FIG. 1D, the first network device and the second network device may exchange link discovery messages (e.g., periodic PDU messages). For example, the first network device may provide a link discovery message to the second network device in order to discover end port details of the second network device, and to discover local and remote port pairing information. Periodic transmission of the link discovery messages may enable the first network device to detect link liveness and to identify a link capable of power state transitions. As shown at step 2 of FIG. 1D, the first network device and the second network device may exchange periodic PDU messages. For example, the first network device and the second network device may utilize the control channel to periodically exchange hello messages for monitoring a session associated with the link.

As shown at step 3 of FIG. 1D, the first network device may provide, to the second network device, a first control channel message (e.g., a PDU message) that identifies the link at the first network device, a current state of the link as a power on state, and a desired state of the link as a power sleep state. For example, the first network device may wish to switch the power state of the link from a power on state to a power sleep state. The first network device may generate a first control channel message that identifies the link at the first network device (e.g., a local port associated with the link, such as link X), the current state of the link (e.g., power on), and the desired state of the link (e.g., power sleep). At time T0, the first network device may provide the first control channel message to the second network device via the control channel, and the second network device may receive the first control channel message at time T1. As shown at step 4 of FIG. 1D, the first network device may receive, from the second network device, a second control channel message (e.g., a PDU message) that identifies the link at the second network device, the current state of the link as the power on state, and the desired state of the link as the power sleep state. For example, the second network device may generate a second control channel message that identifies the link at the second network device (e.g., a local port associated with the link, such as link Y), the current state of the link (e.g., power on), and the desired state of the link (e.g., power sleep). At time T2, the second network device may provide the second control channel message to the first network device via the control channel, and the first network device may receive the second control channel message at time T3.

As shown at step 5 of FIG. 1D, the first network device may determine that the power sleep state requested in the first control channel message is acknowledged when the desired state of the link in the second control channel message is set to the power sleep state. For example, rather than requesting an acknowledgement to the first control channel message, the first network device may determine that the power sleep state requested in the first control channel message is acknowledged when the desired state of the link in the second control channel message is set to the power sleep state. In some implementations, if the second network device disagrees with changing the link to the power sleep state, the second network device may set the desired state of the link in the second control channel message to the power on state.

As shown at step 6 of FIG. 1D, the first network device may divert all traffic flowing on the link. For example, the first network device may divert the traffic on the link to one or more other links associated with the first network device. The second network device may also divert traffic flowing on the link. As shown at step 7 of FIG. 1D, the first network device and the second network device may disable alarm handling for the link. For example, the link may be associated with alarm handling that generates an alarm when the link becomes inoperable. In order to prevent generation of such alarms when the link is placed in the sleep state, the first network device and the second network device may disable the alarm handling for the link.

As shown at step 8 of FIG. 1D, the second network device may not send the second control channel message to the first network device until after the second network device flushes a queue associated with the link. For example, the second network device may flush a queue of traffic associated with the link prior to sending the second control channel message to the first network device. This may ensure that traffic is not lost when the link is placed in the power sleep state. As shown at step 9 of FIG. 1D, the first network device may start a wait timer associated with transitioning the link to the power sleep state at time T4. For example, in order to provide sufficient time for the second network device to flush the queue of traffic associated with the link, the first network device may utilize the wait timer to delay transitioning of the link to the power sleep state. As shown at steps 10 and 11 of FIG. 1D, the first network device may determine that the wait timer is expired (e.g., at time T5), and may power off port devices associated with the link. For example, when the first network device determines that the wait timer has expired, the first network device may transition the link to the power sleep state by powering off port devices (e.g., processors, lasers, and/or the like) associated with the link. As shown at step 12 of FIG. 1D, the link may be disabled or in the power sleep state after the first network device powers off the port devices associated with the link. As shown at step 13 of FIG. 1D, the second network device may power off the port devices (e.g., processors, lasers, and/or the like) associated with the link.

Figure 1E:
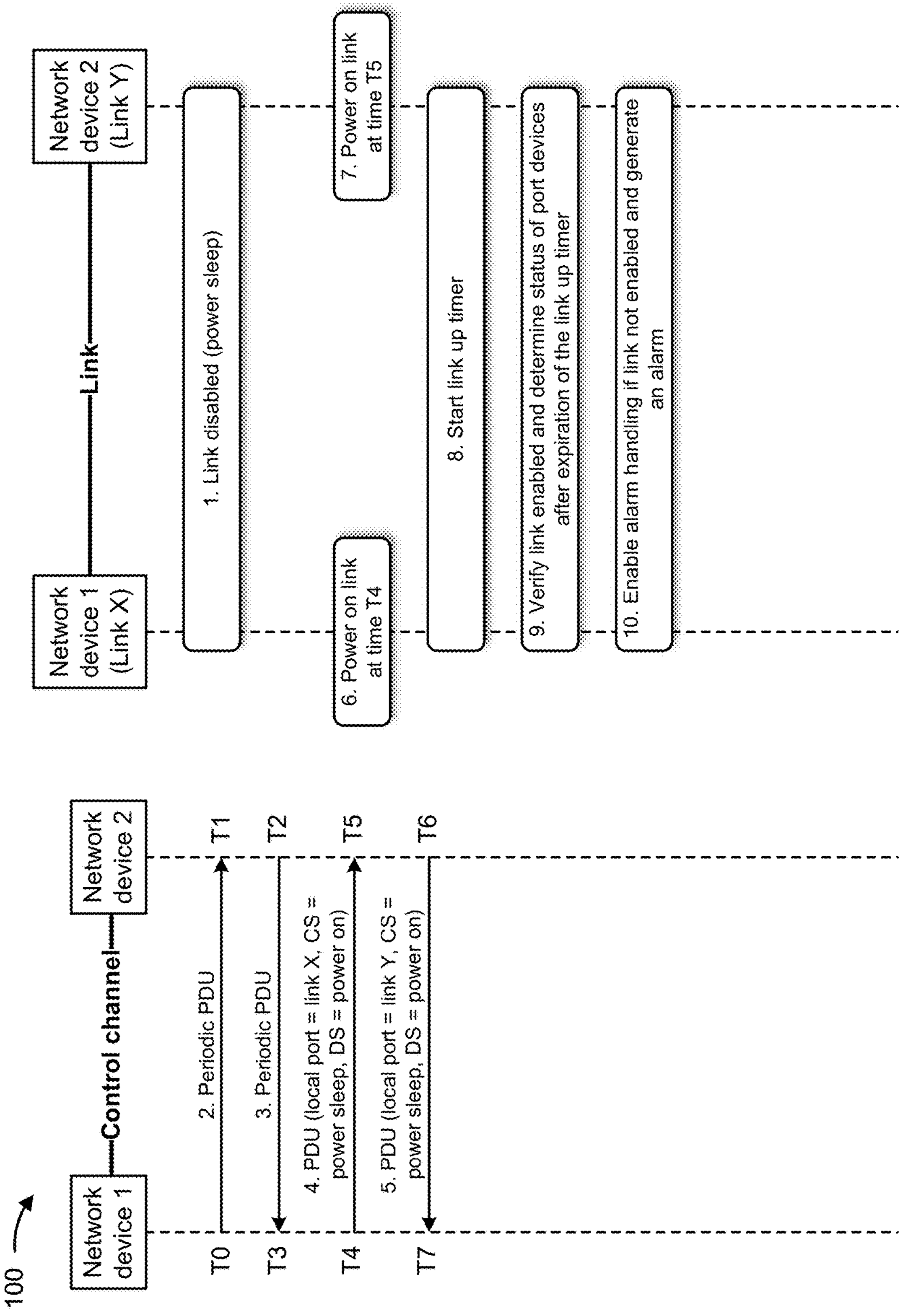

FIG. 1E is a flow diagram depicting example interactions associated with a transition of the link from a power sleep state to a power on state. As shown at step 1 of FIG. 1E, the link may be disabled or in the power sleep state. For example, the steps described above in connection with FIG. 1D may be performed to place the link in the power sleep state. As shown at steps 2 and 3 of FIG. 1E, the first network device may provide a first periodic PDU message to the second network device and via the control channel (e.g., at time TO), and the first network device may receive a second periodic PDU message from the second network device and via the control channel (e.g., at time T3). For example, the first network device and the second network device may utilize the control channel to periodically exchange hello messages for monitoring a session associated with the link. The second network device may receive the first periodic PDU message at time T1, and the second network device may provide the second periodic PDU message to the first network device at time T2.

As shown at step 4 of FIG. 1E, the first network device may provide, to the second network device, a first control channel message (e.g., a PDU message) that identifies the link at the first network device, a current state of the link as a power sleep state, and a desired state of the link as a power on state. For example, the first network device may wish to switch the power state of the link from a power sleep state to a power on state. The first network device may generate a first control channel message that identifies the link at the first network device (e.g., a local port associated with the link, such as link X), the current state of the link (e.g., power sleep), and the desired state of the link (e.g., power on). At time T4, the first network device may provide the first control channel message to the second network device via the control channel, and the second network device may receive the first control channel message at time T5.

As shown at step 5 of FIG. 1E, the first network device may receive, from the second network device, a second control channel message (e.g., a PDU message) that identifies the link at the second network device, the current state of the link as the power sleep state, and the desired state of the link as the power on state. For example, the second network device may generate a second control channel message that identifies the link at the second network device (e.g., a local port associated with the link, such as link Y), the current state of the link (e.g., power sleep), and the desired state of the link (e.g., power on). At time T6, the second network device may provide the second control channel message to the first network device via the control channel, and the first network device may receive the second control channel message at time T7.

As shown at step 6 of FIG. 1E, the first network device may power on the link when providing the first control channel message to the second network device (e.g., at time T4). For example, in order to transition the link from the power sleep state to the power on state, the first network device may power on the port devices (e.g., processors, lasers, and/or the like) associated with the link. Powering on the port devices associated with the link may power on the link. As shown at step 7 of FIG. 1E, the second network device may power on the link when providing the second control channel message to the first network device. For example, in order to transition the link from the power sleep state to the power on state, the second network device may power on the port devices (e.g., processors, lasers, and/or the like) associated with the link. Powering on the port devices associated with the link may power on the link.

As shown at step 8 of FIG. 1E, the first network device may start a link up timer. For example, the first network device may start a link up timer associated with determining whether the link is powered on and enabled to transmit and receive traffic. The link up timer may include a time period that is sufficient for the link to be enabled. As shown at step 9 of FIG. 1E, the first network device may verify that the link is enabled and may determine a status of port devices after expiration of the link up timer. For example, when the link up timer expires, the first network device may determine whether the link is enabled (e.g., in the power on state) and may check the status of the port devices associated with the link. As shown at step 10 of FIG. 1E, the first network device may enable alarm handling if the link is not enabled and may generate an alarm. For example, if the first network device determines that the link is not enabled after expiration of the link up timer, the first network device may enable the alarm handling for the link and may utilize the alarm handling to generate an alarm. In some implementations, if the link is not enabled, the first network device may determine that there is a possible failure at Layer 1 (e.g., the physical layer), and may generate appropriate system alarms.

In this way, the implementations provide a link power management protocol for connected network devices. For example, a first network device may be connected to a second network device via a link. The connected network devices may utilize the link power management protocol to control transition events (e.g., transitioning a link to a power sleep state) gracefully, and to enable higher layer protocols to prepare for the transition events. The first network device may exchange one or more periodic link discovery messages with the second network device to identify a link participating in power state changes. The first network device may exchange one or more control channel messages with the second network device to implement a power state change for the identified link. Thus, the connected network devices conserve computing resources, networking resources, and/or the like that would otherwise have been consumed by failing to adjust power consumption and bandwidth of connected network devices based on a traffic rate, failing to power off links and interfaces of the connected network device during idle states and wasting power with the idle links and interfaces, failing to power off the idle links and interfaces during non-peak utilization times of the connected network devices, unnecessarily maintaining the idle links and interfaces during non-peak utilization times of the connected network devices, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
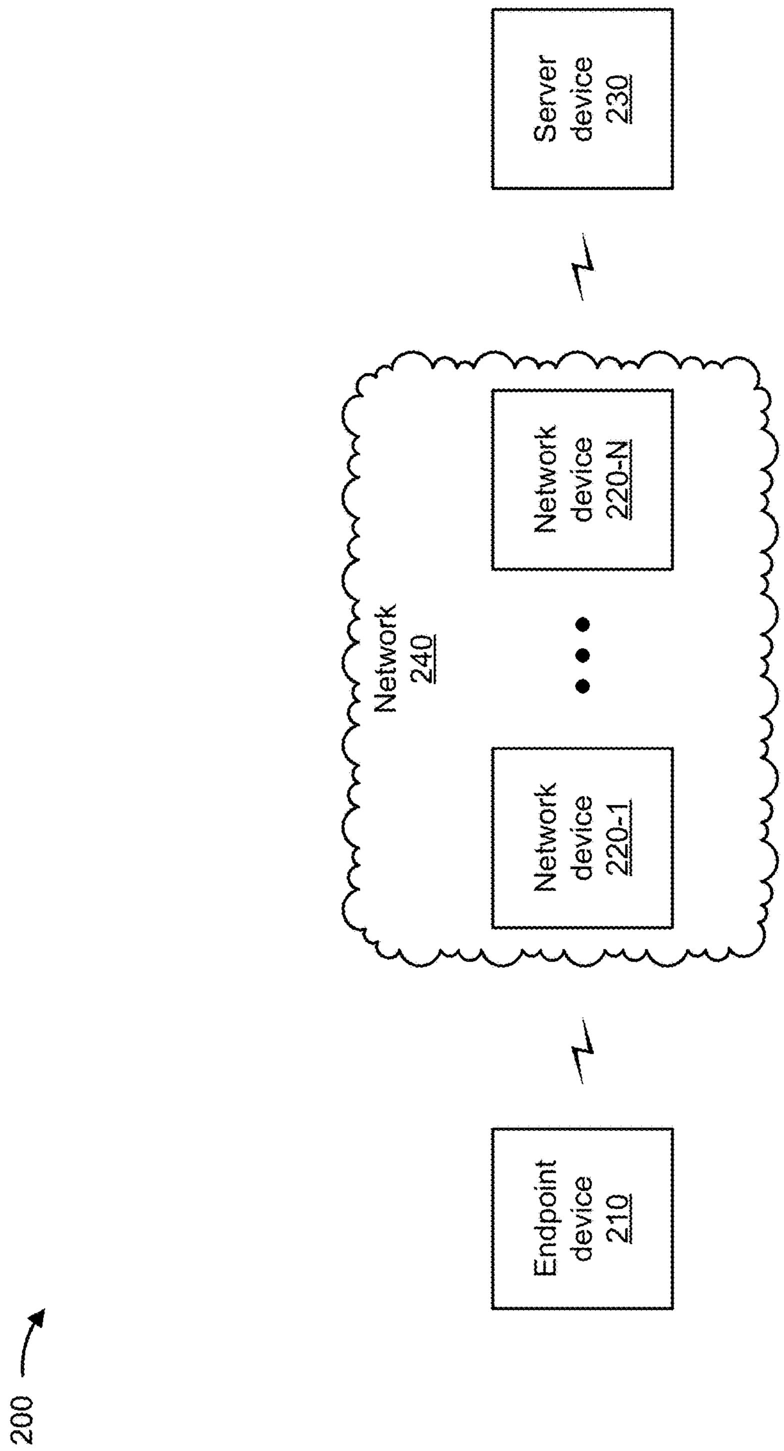
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, a server device, a group of server devices, or a similar type of device. In some implementations, the endpoint device 210 may receive network traffic from and/or may provide network traffic to other endpoint devices 210 and/or the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 may include one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, a third generation (3G) network, a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
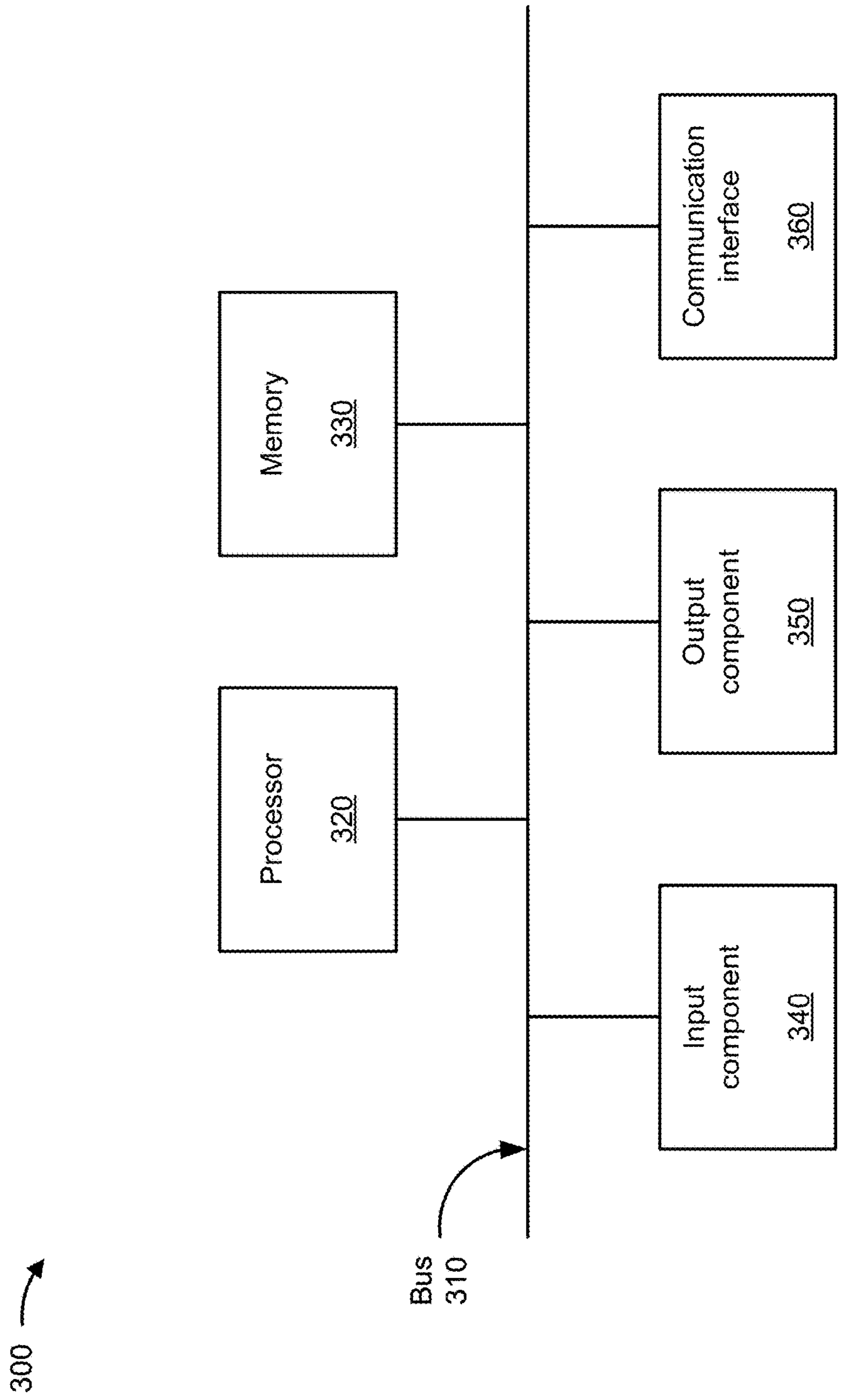
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), an accelerated processing unit (APU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
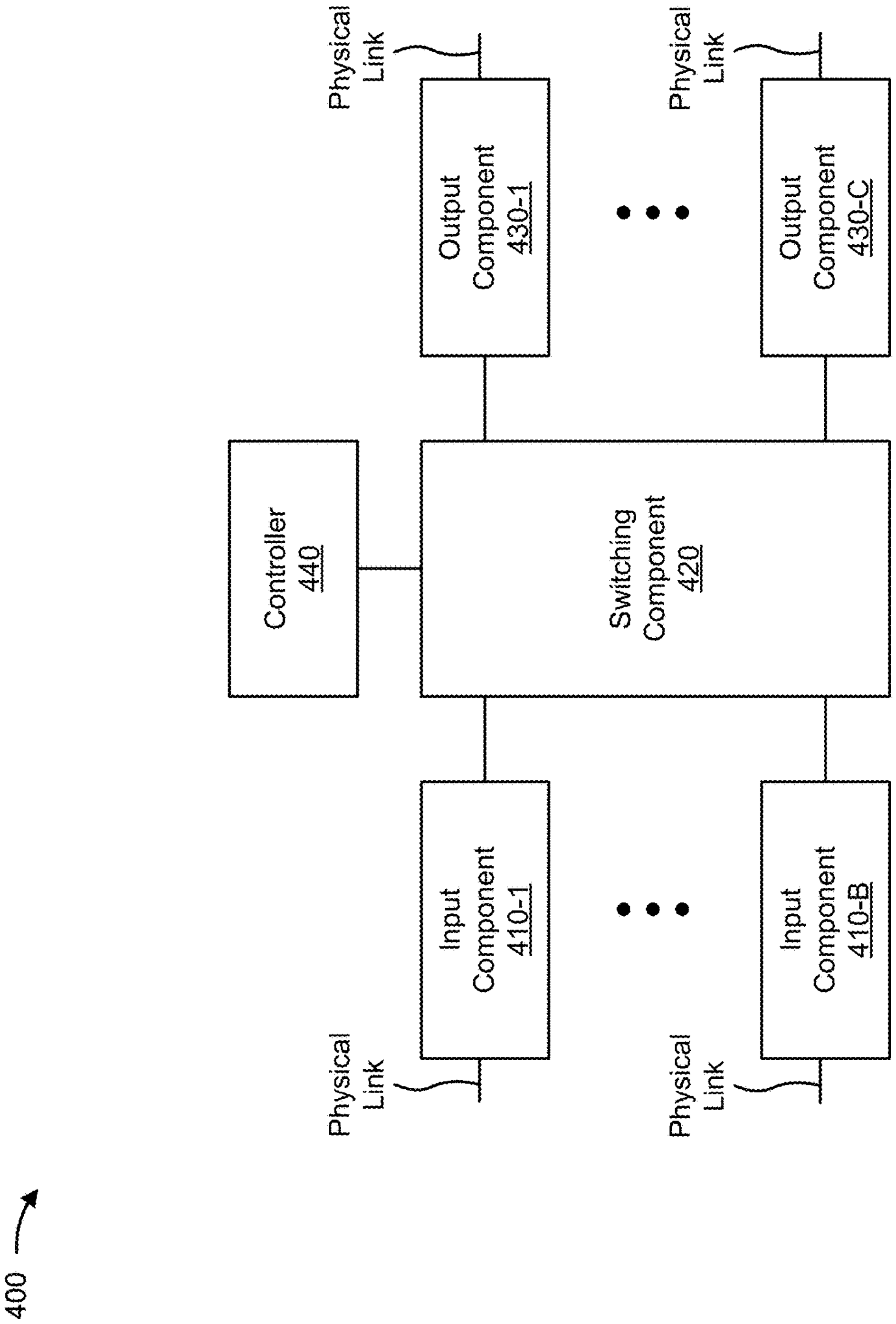

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
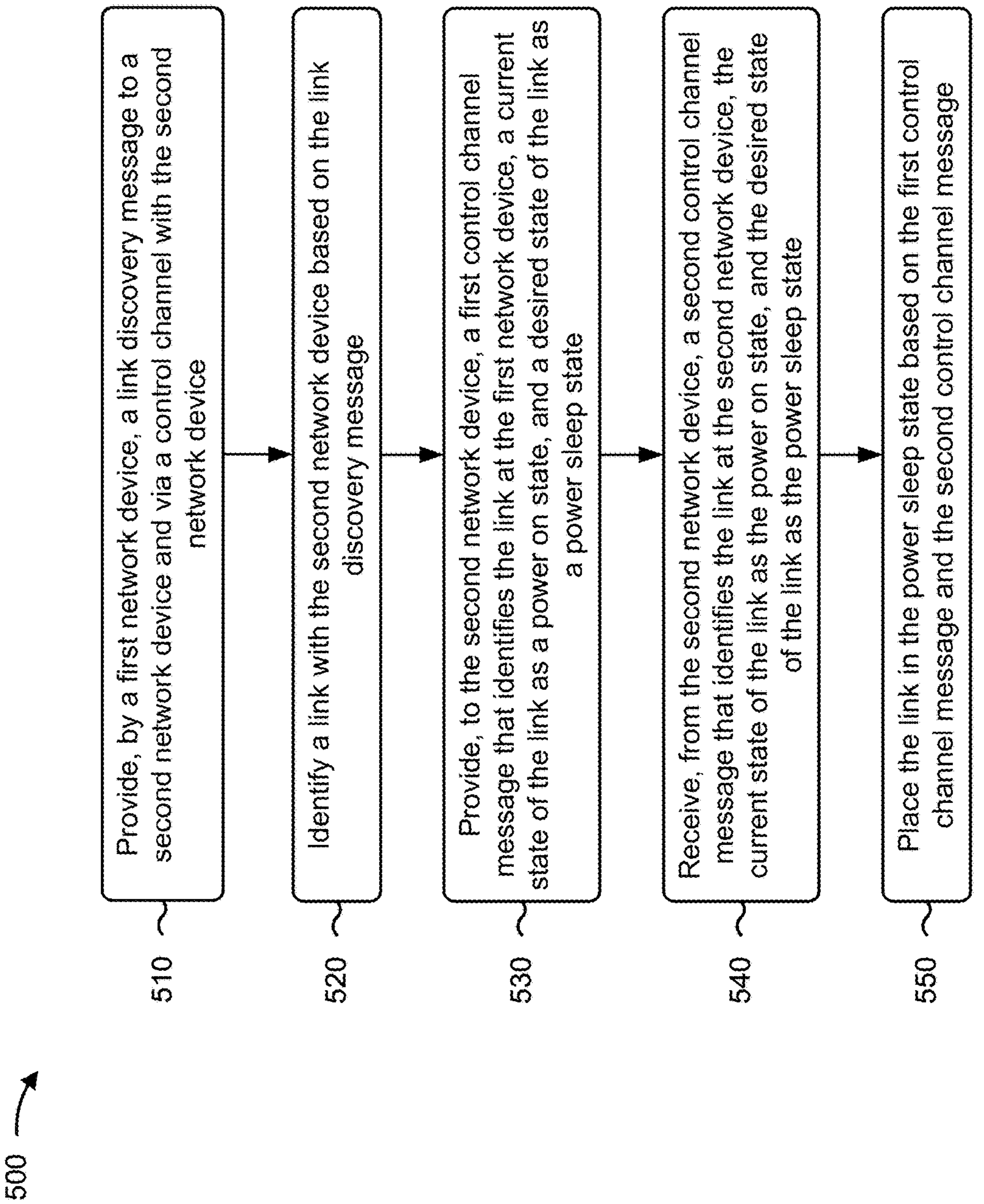
FIG. 5 is a flowchart of an example process for providing a link power management protocol for connected network devices.

FIG. 5 is a flowchart of an example process 500 for providing a link power management protocol for connected network devices. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210) and/or a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include providing a link discovery message to a second network device (block 510). For example, the first network device may provide a link discovery message to a second network device, as described above. In some implementations, the link discovery message is a periodic PDU message. In some implementations, the link discovery message includes an identifier of the first network device, a first name of the link at the first network device, and a second name of the link at the second network device.

As further shown in FIG. 5, process 500 may include identifying a link with the second network device based on the link discovery message (block 520). For example, the first network device may identify a link with the second network device based on the link discovery message, as described above.

As further shown in FIG. 5, process 500 may include providing, to the second network device, a first control channel message that identifies the link at the first network device, a current state of the link as a power on state, and a desired state of the link as a power sleep state (block 530). For example, the first network device may provide, to the second network device, a first control channel message that identifies the link at the first network device, a current state of the link as a power on state, and a desired state of the link as a power sleep state, as described above.

As further shown in FIG. 5, process 500 may include receiving, from the second network device, a second control channel message that identifies the link at the second network device, the current state of the link as the power on state, and the desired state of the link as the power sleep state (block 540). For example, the first network device may receive, from the second network device, a second control channel message that identifies the link at the second network device, the current state of the link as the power on state, and the desired state of the link as the power sleep state, as described above. In some implementations, the second control channel message is not received until after the second network device clears a queue associated with the link. In some implementations, the second network device powers off port devices associated with the link after the second control channel message is received by first network device.

As further shown in FIG. 5, process 500 may include placing the link in the power sleep state based on the first control channel message and the second control channel message (block 550). For example, the first network device may place the link in the power sleep state based on the first control channel message and the second control channel message, as described above. In some implementations, placing the link in the power sleep state includes diverting all traffic flowing on the link, and disabling alarm handling for the link. In some implementations, placing the link in the power sleep state includes determining that a timer associated with transitioning the link to the power sleep state has expired, powering off port devices associated with the link based on determining that the timer associated with transitioning the link to the power sleep state has expired, and placing the link in the power sleep state based on powering off the port devices.

In some implementations, process 500 includes determining that the power sleep state requested in the first control channel message is acknowledged when the desired state of the link in the second control channel message is set to the power sleep state.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In some implementations, process 500 includes providing, to the second network device, a third control channel message that identifies the link at the first network device, the current state of the link as the power sleep state, and the desired state of the link as the power on state, and placing the link in the power on state when providing the third control channel message to the second network device.

In some implementations, process 500 includes receiving, from the second network device, a fourth control channel message that identifies the link at the second network device, the current state of the link as the power sleep state, and the desired state of the link as the power on state. In some implementations, the fourth control channel message causes the second network device to power on the link. In some implementations, process 500 includes starting a link up timer, and verifying that the link is enabled after expiration of the link up timer. In some implementations, process 500 includes enabling alarm handling based on failing to verify that the link is enabled, and generating an alarm with the alarm handling.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

providing, by a first network device, a link discovery message to a second network device;

identifying, by the first network device, a link with the second network device based on the link discovery message;

providing, by the first network device and to the second network device, a first control channel message that identifies the link at the first network device, a current state of the link as a power on state, and a desired state of the link as a power sleep state;

receiving, by the first network device and from the second network device, a second control channel message that identifies the link at the second network device, the current state of the link as the power on state, and the desired state of the link as the power sleep state;

powering off port devices associated with the link based on determining that a timer associated with transitioning the link to the power sleep state has expired, wherein a duration of the timer is based at least in part on a time to flush a queue of traffic associated with the link; and placing, by the first network device, the link in the power sleep state based on the first control channel message, the second control channel message, and on powering off the port devices.

2. The method of claim 1, further comprising:

determining that the power sleep state requested in the first control channel message is acknowledged when the desired state of the link in the second control channel message is set to the power sleep state.

3. The method of claim 1, wherein placing the link in the power sleep state comprises:

diverting all traffic flowing on the link; and disabling alarm handling for the link.

4. The method of claim 1, wherein the second control channel message is not received until after the second network device clears a queue associated with the link.

5. The method of claim 1, wherein the second network device powers off port devices associated with the link after the second control channel message is received by first network device.

6. The method of claim 1, wherein the link discovery message is a periodic protocol data unit message.

7. A first network device, comprising:

one or more memories; and one or more processors to:

provide a link discovery message to a second network device;

identify a link with the second network device based on the link discovery message;

provide, to the second network device, a first control channel message that identifies the link at the first network device, a current state of the link as a power on state, and a desired state of the link as a power sleep state;

receive, from the second network device, a second control channel message that identifies the link at the second network device, the current state of the link as the power on state, and the desired state of the link as the power sleep state;

divert all traffic flowing on the link;

power off port devices associated with the link based on determining that a timer associated with transitioning the link to the power sleep state has expired, wherein a duration of the timer is based at least in part on a time to flush a queue of traffic associated with the link; and place the link in the power sleep state based on the first control channel message, the second control channel message, and on powering off the port devices.

8. The first network device of claim 7, wherein the link discovery message includes an identifier of the first network device, a first name of the link at the first network device, and a second name of the link at the second network device.

9. The first network device of claim 7, wherein the one or more processors are further to:

provide, to the second network device, a third control channel message that identifies the link at the first network device, the current state of the link as the power sleep state, and the desired state of the link as the power on state; and place the link in the power on state when providing the third control channel message to the second network device.

10. The first network device of claim 9, wherein the one or more processors are further to:

receive, from the second network device, a fourth control channel message that identifies the link at the second network device, the current state of the link as the power sleep state, and the desired state of the link as the power on state.

11. The first network device of claim 9, wherein the one or more processors are further to:

start a link up timer; and verify that the link is enabled after expiration of the link up timer.

12. The first network device of claim 11, wherein the one or more processors are further to:

enable alarm handling based on failing to verify that the link is enabled; and generate an alarm with the alarm handling.

13. The first network device of claim 7, wherein the first network device and the second network device are associated with a network controller.

14. A non-transitory computer-readable medium storing a set of instructions, the set of instructions comprising:

one or more instructions that, when executed by one or more processors of a first network device, cause the first network device to:

provide a link discovery message to a second network device;

identify a link with the second network device based on the link discovery message;

provide, to the second network device, a first control channel message that identifies the link at the first network device, a current state of the link as a power on state, and a desired state of the link as a power sleep state;

receive, from the second network device, a second control channel message that identifies the link at the second network device, the current state of the link as the power on state, and the desired state of the link as the power sleep state;

determine that the power sleep state requested in the first control channel message is acknowledged when the desired state of the link in the second control channel message is set to the power sleep state;

power off port devices associated with the link based on determining that a timer associated with transitioning the link to the power sleep state has expired, wherein a duration of the timer is based at least in part on a time to flush a queue of traffic associated with the link; and place the link in the power sleep state based on the first control channel message, the second control channel message, and on powering off the port devices.

15. The non-transitory computer-readable medium of claim 14, wherein the one or more instructions, that cause the first network device to place the link in the power sleep state, cause the first network device to:

divert all traffic flowing on the link; and disable alarm handling for the link.

16. The non-transitory computer-readable medium of claim 14, wherein the one or more instructions further cause the first network device to:

provide, to the second network device, a third control channel message that identifies the link at the first network device, the current state of the link as the power sleep state, and the desired state of the link as the power on state; and place the link in the power on state when providing the third control channel message to the second network device.

17. The non-transitory computer-readable medium of claim 16, wherein the one or more instructions further cause the first network device to:

receive, from the second network device, a fourth control channel message that identifies the link at the second network device, the current state of the link as the power sleep state, and the desired state of the link as the power on state.

18. The non-transitory computer-readable medium of claim 17, wherein the fourth control channel message causes the second network device to power on the link.

19. The method of claim 1, wherein the link discovery message is a layer 3 Internet Protocol (IP) frame with a time to live (TTL) value set to one.

20. The non-transitory computer-readable medium of claim 14, wherein the link discovery message is a layer 3 Internet Protocol (IP) frame with a time to live (TTL) value set to one.

* * * * *